US008603664B2

(12) United States Patent
Ishizu et al.

(10) Patent No.: US 8,603,664 B2
(45) Date of Patent: Dec. 10, 2013

(54) ASSEMBLED BATTERY WITH STACKED METAL PLATE CONNECTION MEMBER

(75) Inventors: Takenori Ishizu, Honjou (JP); Tooru Kojima, Fukaya (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 1593 days.

(21) Appl. No.: 11/696,616

(22) Filed: Apr. 4, 2007

(65) Prior Publication Data

US 2008/0063932 A1 Mar. 13, 2008

(30) Foreign Application Priority Data

Sep. 7, 2006 (JP) .................................. 2006-242230

(51) Int. Cl.
*H01M 2/22* (2006.01)
*H01M 2/20* (2006.01)
*H01M 2/02* (2006.01)

(52) U.S. Cl.
USPC ............ 429/158; 429/160; 429/163; 429/178

(58) Field of Classification Search
USPC .................................. 429/158, 160, 163, 178
See application file for complete search history.

(56) References Cited

U.S. PATENT DOCUMENTS

| 6,048,637 | A * | 4/2000 | Tsukahara et al. | 429/53 |
| 6,472,098 | B1 * | 10/2002 | Sawada et al. | 429/163 |
| 2003/0064285 | A1 * | 4/2003 | Kawamura et al. | 429/175 |

FOREIGN PATENT DOCUMENTS

| CN | 1551384 A | | 12/2004 |
|---|---|---|---|
| JP | 11-265701 A | | 9/1999 |
| JP | 11-297300 A | | 10/1999 |
| JP | 2000-36299 A | | 2/2000 |
| JP | 2000036299 A | * | 2/2000 |
| JP | 2000-77052 A | | 3/2000 |
| JP | 2001-283933 A | | 10/2001 |
| JP | 2002-358945 A | | 12/2002 |
| JP | 2004-311165 A | | 11/2004 |
| JP | 2004-319342 A | | 11/2004 |
| JP | 2004311165 A | * | 11/2004 |
| JP | 2005135634 A | * | 5/2005 |
| JP | 2006-139987 A | | 6/2006 |

OTHER PUBLICATIONS

Machine Translations for Kojima, JP 2000-036299 A, and Sato, JP 2004-311165 A.*
Machine translation for Tatebayashi et al., JP 2005-135634 A.*
Office Action dated Jan. 23, 2009 issued by The State Intellectual Property Office of China in corresponding Chinese Patent Application No. 200710091394.6.

(Continued)

*Primary Examiner* — Edu E Enin-Okut
(74) *Attorney, Agent, or Firm* — Roberts Mlotkowski Safran & Cole P.C.

(57) ABSTRACT

An assembled battery is provided which can improve output density. Four unit cells are connected in series by a connection member 40 composed of a stacked metal plate obtained by stacking two metal plates 40a and 40b. The metal plate 40a is one of copper and aluminum while the metal plate 40b is nickel. Since the volume electrical resistance of both copper and aluminum is less than half that of nickel, the overall electrical resistance of the connection member 40 is lowered. Both end portions of the connection member 40 are joined to external electrode terminals by resistance welding so that the weld joint is formed from either a Cu—Ni or Al—Ni low resistance binary alloy.

10 Claims, 3 Drawing Sheets

(56) References Cited

OTHER PUBLICATIONS

Office Action dated Mar. 31, 2009 issued by the Japanese Patent Office in corresponding Japanese Patent Application No. 2006-242230.
European Search Report dated Apr. 11, 2008 from corresponding European Patent Application No. EP 07 10 5783.
Office Action dated Dec. 11, 2009 issued by the Korean Intellectual Property Office in corresponding Korean Patent Application No. 10-2007-0031422.
Office Action dated Feb. 17, 2011 issued by the State Intellectual Property Office of China in Patent Application No. 200710091394.6 (The Office Action and English translation are attached).

* cited by examiner

ASSEMBLED BATTERY WITH STACKED METAL PLATE CONNECTION MEMBER

FIELD OF THE INVENTION

The present invention relates to an assembled battery, and in particular to an assembled battery obtained by electrically connecting a plurality of unit batteries via a connection member.

DESCRIPTION OF THE RELATED ART

Conventionally, an electric appliance using a battery was mainly used by purchasing a battery or plural batteries to connect them, but a main trend in a battery for a recent notebook type personal computer or for a mobile video camera, a battery for an electric vehicle, or the like lies in use of an assembled battery obtained by electrically connecting a plurality of unit batteries preliminarily. Performance required for the assembled battery varies according to use applications, and since a long usable time per charging is required for an assembled battery for a notebook type personal computer or a mobile video camera, performance of high energy density (unit: Wh/kg) is demanded. On the other hand, since high output is required for an assembled battery for an electric power tool or for a hybrid electric vehicle (HEV) in order to drive a motor, high output density (unit: W/kg) is demanded. Because a lithium secondary battery, to these requirements, has a voltage and an energy density higher than those of other secondary batteries, it is expected to be used in various applications.

However, even if an assembled battery composed of lithium secondary batteries is used as the battery for the HEV, a motor for driving the HEV is required to have high output, so that the assembled battery is required not only to have high output but also to allow large current charging and discharging. For mounting the HEV on a vehicle, it is also required to reduce weight. A current at a maximum load time to a motor used in the HEV generally reaches at least 5 times as large as one hour rate discharging current to a rated capacity of a unit battery. Therefore, in order to allow large current charging and discharging in the assembled battery, it is necessary to retain not only unit batteries but also external connection for the unit batteries in a large current chargeable and dischargeable state.

A metal wire or a metal plate having a single composition is generally used as a connection member for electrically connecting the unit batteries. Especially, when a nickel-plated steel plate which is widely used as material for a battery container of a conventional unit battery is used as a battery container, a single nickel plate is often used because of its good weldability (e.g. JP-A-2004-319342).

However, as described above, in the assembled battery for the HEV, it is necessary to flow current at least 5 times as large as one hour rate discharging current to the rated capacity of the unit battery. When a nickel plate having a relatively high volume resistivity is used as the connection member, it is necessary to set the nickel plate several times to several tens times as thick as the connection plate used in the battery for the notebook type personal computer in order to secure a sectional area which allows large current flow. As a result, reduction in weldability or poor welding of the connection member occurs, and energy density or input/output density lowers due to an increase in weight, so that vehicle performance of the HEV can not be improved even if such an assembled battery is mounted on the HEV.

SUMMARY OF THE INVENTION

The present invention has been made in view of these circumstances, and an object thereof is to provide an assembled battery which can improve output density.

In order to achieve the above object, there is provided an assembled battery obtained by electrically connecting a plurality of unit batteries via a connection member, wherein the connection member is a stacked metal plate obtained by stacking at least two kinds of metal plates, and a binary alloy is produced between the metal plates adjacent to each other at connection portions connected to the unit batteries by welding.

In the present invention, since the connection member is the stacked metal plate obtained by stacking at least two kinds of metal plates, reduction in weight and reduction in electric resistance can be achieved by stacking, on one kind of the at least two kinds of metal plates, the other metal plate having a density lower than that of the one metal plate or a volume resistivity smaller than that of the one metal plate. Since the binary alloy is produced between the metal plates adjacent to each other at connection portions of the connection member connected to the unit batteries by welding, contact resistance between the metal plates at the connection portions is reduced. Accordingly, since a plurality of unit batteries are connected via the connection member with reduced electric resistance, an output density of the assembled battery can be improved.

In this case, by constituting the connection member such that a ratio of volume resistances ($\Omega$m) of metals respectively used in the at least two kinds of metals is 1/2 or less, the electric resistance of the connection member can be further reduced. An exterior container of each unit batteries may be plated with the same metal as metal of one kind of the metal plates. When such a constitution is adopted that the connection portion is obtained by joining an exterior container and the binary alloy by welding, the number of parts can be reduced as compared with a conventional method where connection is achieved by screw fastening. When the screw fastening is adopted, contact resistance occurs due to contact of the connection member and the exterior container, but since the connection member and the exterior container are alloyed at the connection portion, contact resistance is reduced so that output lowering can be suppressed. Two kinds of metal plates of the metal plates may include copper and nickel as their main metals, respectively, and they may include aluminum and nickel as the main metals, respectively. Such a connection member may have connection portions at both end portions thereof and a central portion thereof may be stepped to the both end portions.

According to the present invention, since the connection member is the stacked metal plate obtained by stacking at least two kinds of metal plates, reduction in weight or reduction in electric resistance can be achieved by stacking, on one kind of the at least two kinds of metal plates, the other metal plate having a density lower than that of the one metal plate or a volume resistivity smaller than that of the one metal plate. Since the binary alloy is produced between the metal plates adjacent to each other at connection portions of the connection member connected to the unit batteries by welding, contact resistance between the metal plates at the connection portion is reduced, and since a plurality of unit batteries are connected via the connection member having reduced electric resistance, an output density of the assembled battery can be improved.

DETAILED DESCRIPTION OF THE PREFERRED EMBODIMENTS

An embodiment where the present invention is applied to an assembled battery using flat cylindrical lithium secondary batteries will be explained with reference to the drawings.
(Constitution)

Figure 1:
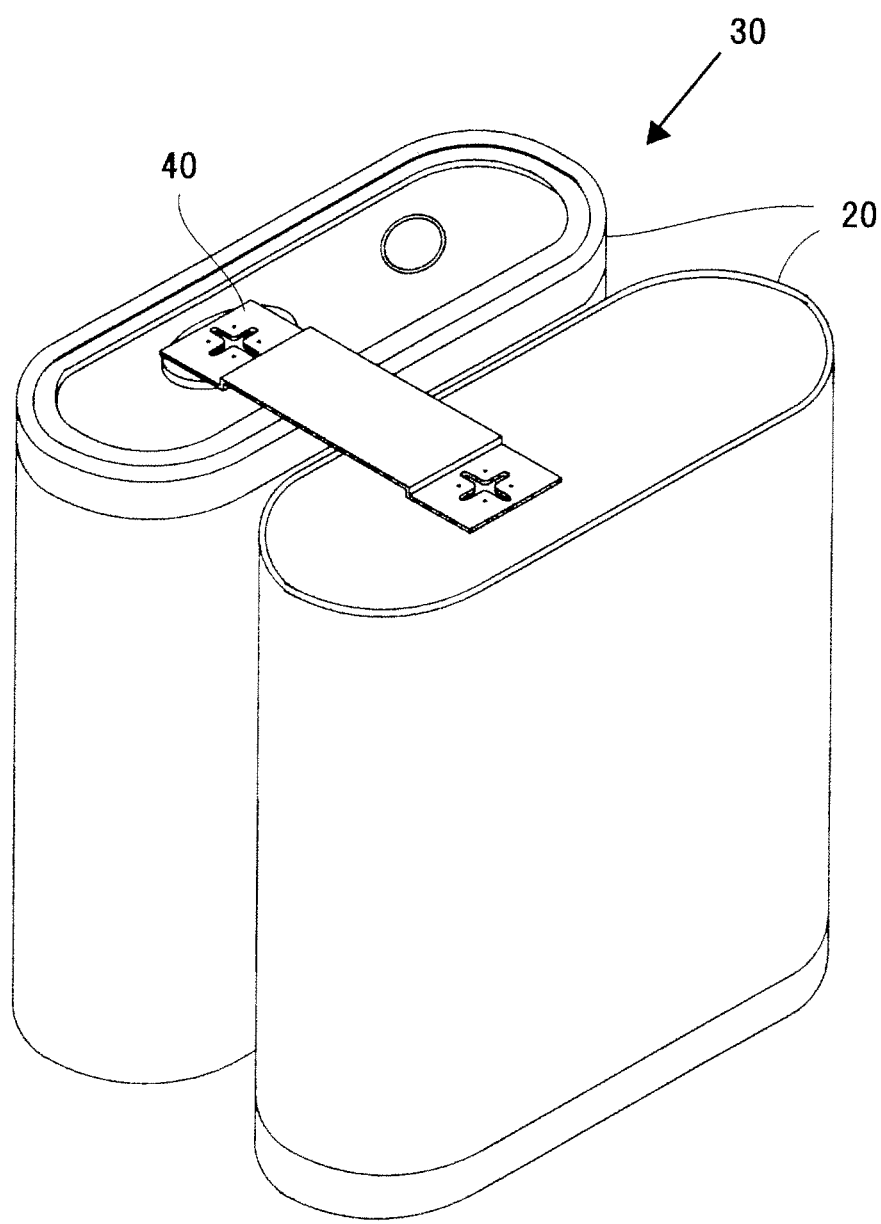
FIG. 1 is a perspective view of two unit batteries among unit batteries constituting an assembled battery of an embodiment to which the present invention is applied.

An assembled battery 30 of the embodiment is composed of four flat cylindrical lithium secondary batteries (hereinafter, called "unit cell"). As shown in FIG. 1, two unit cells 20 adjacent to each other are disposed in parallel in a state that side faces of flat cylindrical sections thereof extending along their major axes are opposed to each other such that their polarities are alternate. The unit cells 20 adjacent to each other are connected to each other via a connection member 40. That is, four unit cells 20 constituting the assembled battery 30 are connected in series through three connection members 40. Incidentally, in FIG. 1, only two adjacent unit cells 20 are shown and the remaining two unit cells 20 are omitted.

Figure 2:
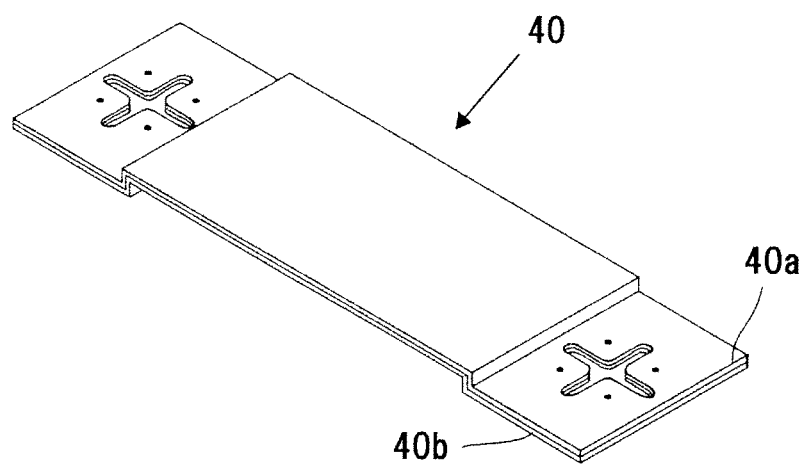
FIG. 2 is a perspective view of an appearance of a connection member used for connection of the unit batteries constituting the assembled battery of the embodiment.

As shown in FIG. 2, the connection member 40 is composed of a stacked metal plate obtained by stacking two metal plates 40a and 40b. Each of the metal plates 40a and 40b is formed in an approximately rectangular shape and a central portion thereof is formed in a flat plane projecting relative to both end portions thereof via steps. The central portion is positioned above the both end portions via the steps. A length of the projecting central portion of the metal plate 40a in a longitudinal direction is adjusted such that the central portion of the metal plate 40b is fitted into a recessed portion of a back side of the metal plate 40a. Metals producing binary alloy by welding are used in the adjacent metal plates 40a and 40b. Metals used in the metal plates 40a and 40b are set such that a ratio of volume resistances (unit: Ωm) thereof is 1/2 or less. In the embodiment, copper is used as material for the metal plate 40a, while nickel is used as material for the metal plate 40b. Since the volume resistivity of copper is about ¼ of that of nickel, the ratio of volume resistances of metals used in the metal plates 40a and 40b becomes 1/2 or less. An outer size of the connection member 40 is set to a size where current of at least five times one hour-rate discharging current to a rating capacity of the unit cell 20 can flow in the connection member 40. In this embodiment, the outer size is set to have a length of 60 mm, a width of 20 mm, and a thickness of 0.5 mm.

The both end portions of the connection member 40 are joined to a positive electrode external terminal of one of the adjacent unit cells 20 and a negative electrode external terminal of the other by resistance welding, respectively. The both end portions of the connection member 40 are each formed with an approximately cross-shaped opening. The positive electrode external terminal and the connection member 40, and the negative electrode external terminal and the connection member 40 are alloyed at the connection portions joined by resistance welding, respectively. Copper and nickel in the metal plates 40a and 40b produce binary alloy due to the resistance welding. In the assembled battery 30, a positive electrode external terminal of a unit cell 20 of four unit cells which takes the highest voltage and a negative electrode external terminal of a unit cell 20 thereof which takes the lowest voltage constitute the positive electrode and the negative electrode of the assembled battery 30, respectively.

Figure 3:
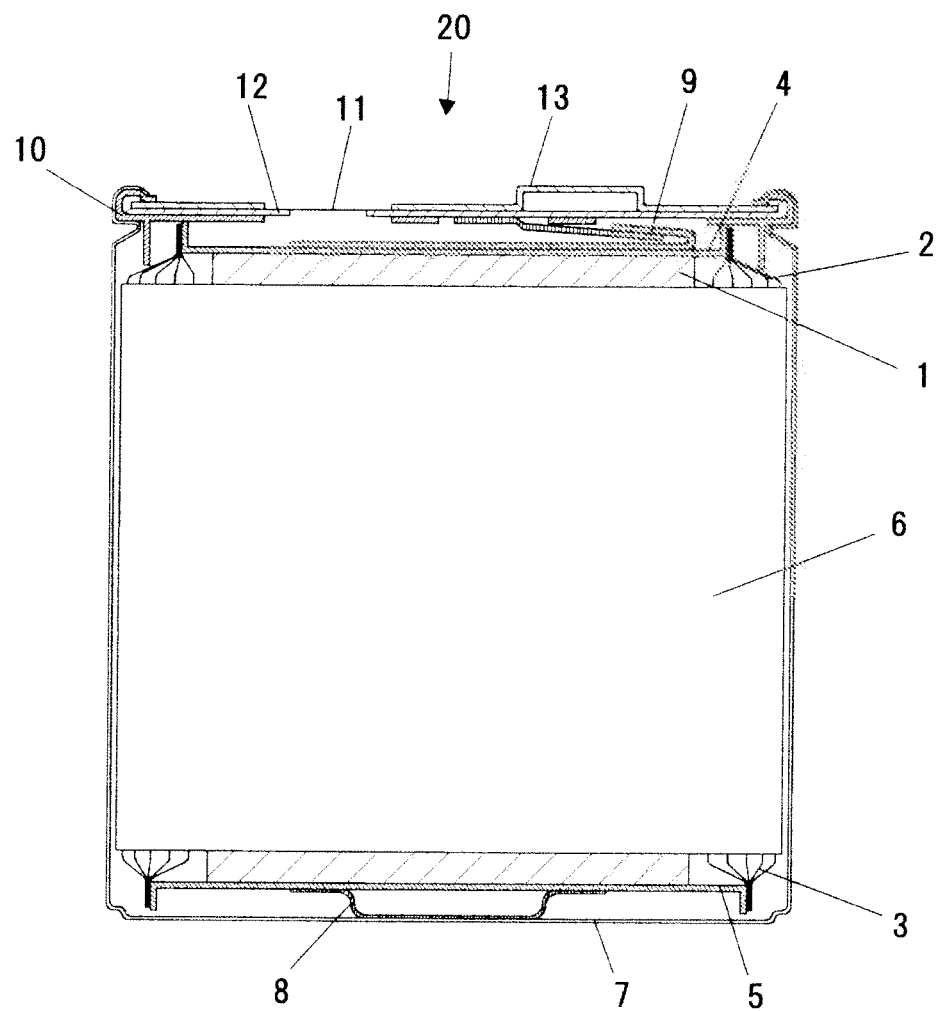
FIG. 3 is a sectional view of a flat cylindrical lithium secondary battery which is a unit battery constituting the assembled battery of the embodiment.

As shown in FIG. 3, each unit cell 30 constituting the assembled battery 30 has a battery container (a portion of an exterior container of the unit cell 20)7 made from steel, formed in a flat cylindrical shape in section, and nickel-plated. A winding group 6 which is an electric generation element where strip-like positive and negative electrode plates have been wound via a separator is accommodated inside the battery container 7. A hollow and flat cylindrical shaft core 1 made from polypropylene is disposed at a winding center of the winding group 6. Incidentally, in FIG. 3, an interior of the winding group 6 is omitted.

A positive electrode electricity-collecting ring 4 for collecting potential from a positive electrode plate is disposed above the winding group 6. The positive electrode electricity-collecting ring 4 is formed in a flat doughnut plate shape and it is fixed to an upper end portion of the shaft core 1. Positive electrode lead pieces 2 extended out of the positive electrode are deformed and collected near a flange portion peripheral face extending integrally from a periphery of the positive electrode electricity-collecting ring 4, and the positive electrode lead pieces 2 and a flange portion peripheral face are joined by ultrasonic welding. An insulating coating is applied on the flange portion peripheral face of the positive electrode electricity-collecting ring 4 over a whole circumference thereof. A flat disk-like battery lid (a portion of the exterior container of the unit cell 20) for sealing of an opening of the battery container 7 is disposed above the positive electrode electricity-collecting ring 4. The battery lid is composed of a lid case 12 made from aluminum and having a rupturing valve 11 preliminarily welded on one side from a center in a longitudinal direction thereof and a lid cap 13 made from steel and nickel-plated, and it is assembled by stacking the lid case 12 and the lid cap 13 to crimp and fix a peripheral edge portion of the lid case 12 to the lid cap 13. In the battery lid, the lid case 12 is disposed on the side of the winding group 6, and the lid cap 13 is disposed on the outside. Therefore, since nickel-plating is applied to both the battery container 7 and the battery lid (the lid cap 13), the exterior container of the unit cell 20 is plated with the same kind of metal (nickel) as the metal for the metal plate 40b constituting the connection member 40. An opening is formed on the lid cap 13 at a position thereof corresponding to the rupturing valve 11 on the side from the central portion in the longitudinal direction, and a protrusion with an approximately circular shape in section which serves as the positive electrode external terminal is formed on the other side (on the opposite side of the rupturing valve 11) from the central portion in the longitudinal direction. One end of a positive lead 9 constituted by stacking a plurality of ribbons made from aluminum preliminarily is joined to an upper portion of the positive electrode electricity-collecting ring 4 by welding, and the other end thereof is joined to a lower face of the battery lid.

On the other hand, a negative electrode electricity-collecting ring 5 for collecting electricity from the negative electrode is disposed below the winding group 6. The negative electrode electricity-collecting ring 5 is formed in a flat doughnut plate shape and it is fixed to a lower end portion of the shaft core 1. Negative electrode lead pieces 3 extended out of the negative electrode are joined to a peripheral face of the negative electrode electricity-collecting ring 5 by ultrasonic welding like the connection operation of the positive electrode electricity-collecting ring 4 and the positive electrode lead pieces 2. A negative electrode lead plate 8 for electrical conduction is preliminarily welded to a lower side of the negative electrode electricity-collecting ring 5.

The battery lid is crimped and fixed to an upper portion of the battery container 7 via a gasket 10 made from EPDM resin. The positive electrode lead 9 is accommodated in the battery container 7 in a folding manner, and the unit cell 20 is sealed. Non-aqueous electrolyte solution (not shown) is charged in the battery container 7 by such an amount that the whole winding group 6 can be immersed. As the non-aqueous electrolyte solution, one obtained by solving lithium hexafluorophosphate (LiPF$_6$) into mixed solvent obtained by mixing ethylene carbonate (EC) and dimethyl carbonate (DMC) which are organic solvents at a volume ratio of 1:2 at a concentration of 1 mol/liter is used. The unit cell 20 is set to a capacitance of 16.0 Ah and a mass of 800 g. Incidentally, an electricity-collecting member and a connection portion from the winding group 6 to the positive and negative external terminals in the unit cell 20 are manufactured such that current of at least 5 times one hour-rate discharging current to a rating capacity can flow therein.

The winding group 6 is configured by winding the positive electrode plate and the negative electrode plate around the shaft core 1, for example, via a fine-porous separator made from polyethylene and having a width of 90 mm and a thickness of 40 μm such that both the plates do not come in direct contact with each other. The positive electrode lead pieces 2 and the negative electrode lead pieces 3 extended out of the positive electrode plate and the negative electrode plate are disposed on the opposite end faces of the winding group 6 to each other.

In the positive electrode plate constituting the winding group 6, lithium transition metal double oxide such as, for example, lithium manganate is used as positive electrode active material. The positive electrode plate is obtained by coating positive electrode mixture on a strip-like aluminum foil (a positive electrode electricity-collecting body) approximately evenly. Powder of lithium transition metal double oxide, carbon powder serving as conductive material, and a polyvinylidene-fluoride (hereinafter, abbreviated as "PVDF") serving as binder are mixed in the positive electrode mixture. When the positive electrode mixture is applied to the aluminum foil, the viscosity of the mixture is adjusted by using N-methylpyrrolidone (hereinafter, abbreviated as "NMP") which is solvent. A non-applied portion of the positive electrode mixture remains on one side edge of one side of the aluminum foil in its longitudinal direction, and the positive electrode lead pieces 2 are formed by cutting the non-applied portion in comb-shaped manner. The positive electrode plate is press-shaped and cut out after dried.

On the other hand, in the negative electrode plate, carbon material such as, for example, amorphous carbon is used as the negative electrode active material. The negative electrode plate is obtained by coating negative electrode mixture on a strip-like copper foil (negative electrode electricity-collecting body) approximately evenly. Powder of amorphous carbon and PDVF serving as binder are mixed in the negative electrode mixture. When the negative electrode mixture is applied on the copper foil, its viscosity is adjusted using NMP which is solvent. The negative electrode lead pieces 3 are formed on one side edge of the copper foil on one side in the longitudinal direction like the positive electrode plate. The negative electrode plate is press-shaped and cut off after dried.

(Operation or the Like)

Next, an operation of the assembled battery 30 of the embodiment or the like will be explained mainly referring to the connection member 40.

In the assembled battery 30 of the embodiment, the connection plate 40 of the stacked metal plate obtained by stacking the metal plates 40$a$ and 40$b$ is used for connection of adjacent unit cells 20, where copper and nickel which produce binary alloy by welding are used for the metal plates 40$a$ and 40$b$, respectively. Therefore, the metal plates 40$a$ and 40$b$ are alloyed according to joining of both the end portions of the connection member 40 to the adjacent unit cells 20 performed by resistance welding. Since the density of copper used in the metal plate 40$a$ and the density of nickel used in the metal plate 40$b$ are approximately the same, the mass of the connection member 40 is approximately the same as the mass of a connection member made from nickel single substance and manufactured to have the same size (the same shape) as that of the connection member 40. On the other hand, since the volume resistivity of copper is about ¼ of that of nickel, a ratio of volume resistances of nickel and copper used in the metal plates of the connection member 40 is set to 1/2 or less. Since the metal plates 40$a$ and 40 are alloyed, electric resistance of the connection member 40 is largely reduced without causing contact resistance between the metal plates 40$a$ and 40$b$, as compared with a connection member made from nickel single substance. Thereby, in the assembled battery 30 obtained by connecting unit cells 20 via the connection member 40 having reduced electric resistance, since electrical resistance is reduced as a whole, high output density can be maintained even during large current charging/discharging. Such an assembled battery 30 can be preferably used for a vehicle-mounting power source for a HEV which allows large current charging/discharging and is required to have performance of high output density.

In the assembled battery 30 of the embodiment, both the end portions of the connection member 40 are joined to the adjacent unit cells 20 by resistance welding. Therefore, the number of parts can be reduced largely, as compared with the conventional method for connecting unit cells and a connection member though screws. In the embodiment, the battery container 7 of the unit cell 20 and the lid cap 13 of the battery lid are nickel-plated, and the connection member and the unit cell 20 are alloyed at the connection portion. Therefore, contact resistance occurs in the conventional screw fastening due to contact between the connection portion and the unit cell (the positive electrode external terminal, the negative electrode external terminal), but contact resistance does not occur in the embodiment between the unit cells 20 and the connection member 40 alloyed, so that larger current flow can be made possible. Since copper and nickel producing binary alloy are used for the metal plates 40$a$ and 40$b$ constituting the connection member 40, respectively, the metal plates 40$a$ and 40$b$ are also welded to each other during resistance welding between the unit cells 20 and the connection member 40. At this time, since nickel and copper produce binary alloy, the metal plates 40$a$ and 40$b$ and the exterior container of the unit cell 20 are alloyed at the connection portion, and contact resistance between the connection member 40 and the unit cells 20 is reduced so that electric resistance of the assembled battery 30 can be reduced.

Incidentally, in the embodiment, the stacked metal plate obtained by stacking the metal plate 40$a$ made from copper and the metal plate 40$b$ made from nickel has been shown as an example of the connection member, but the present invention is not limited to this example, and a stacked metal plate obtained by stacking at least two metal plates may be used as the connection member. For example, a stacked metal plate composed of two metal plates made from copper and a nickel plate interposed therebetween may be used, or a stacked metal plate obtained by stacking three metal plates of a metal plate made from copper, a metal plate made from aluminum, and a metal plate of nickel may be used. The number of metal plates to be stacked is not limited to a specific one, but when the connection member becomes excessively thick, poor welding may be caused. Therefore, it is preferable that the thickness of the connection member is adjusted within a large current discharging allowable range. Such a constitution may be adopted that the metal plate 40a is made from nickel and the metal plate 40b is made from copper, but it is preferable for excellent weldability that the metal plate 40b is made from nickel considering that the battery container 7 and the lid cap 13 have been nickel-plated.

In the embodiment, the combination of copper and nickel as metals (qualities) used for the adjacent metal plates of the stacked metal plate for the connection member 40 has been shown, but the present invention is not limited to this combination, and any combination where main metals of the adjacent metal plates produce binary alloy by welding can be adopted. As usable combinations of metals other than the combination shown in the embodiment, for example, there are combinations of aluminum and nickel, sliver and nickel, aluminum and magnesium, aluminum and tungsten, copper and magnesium, and the like. Alloys containing these metals as main components may be used. Considering an effect of electric resistance reduction, it is preferable that a ratio of volume resistances of at least two kinds of metals used for the metal plates is set to 1/2 or less. For example, in the combination of aluminum and nickel, since the volume resistivity of aluminum is about 2/5 of that of nickel, electric resistance can be reduced as compared with a connection member made from aluminum single substance. Besides, since the density of aluminum is about 1/3 of that of nickel, the connection member 40 can be reduced in weight, and the assembled battery 30 can therefore be reduced in weight. In the combination of nickel and copper shown in the embodiment, since the density of copper is approximately the same as that of nickel, reduction in weight can be achieved, but since the volume resistivity of copper is about 1/4 of that of nickel, further reduction of electric resistance can be achieved as compared with the connection member 40 obtained according the combination of nickel and aluminum. As described above, by adopting the stacked metal plate as the connection member 40, various effects or advantages can be achieved as compared with using of a metal plate made from single component as the connection plate.

In the embodiment, the example that the stacked metal plates 40a and 40b are also welded and alloyed when connection of the unit cells 20 is performed via the connection member 40 has been shown, but the present invention is not limited to this example. Before the stacked metal plates 40a and 40b are assembled into the assembled battery 30, welding is performed preliminarily, so that the metal plates 40a and 40b can be alloyed to reduce electric resistance. In the embodiment, the example that steel plates nickel-plated are used as the materials for the battery container 7 of the unit cell 20 and the lid cap 13 has been shown, but the present invention is not limited to this example. The steel may be plated with metal of the same kind as a kind of metal plate constituting the connection member 40 or the battery container 7 and the lid cap 13 may be formed from a single component of nickel or copper. Considering metal corrosion during charging and discharging or cost reduction, it is preferable that steel (a steel plate) nickel-plated is used.

In the embodiment, the example that the connection member 40 is formed in an approximately rectangular shape where the central portion in the longitudinal direction is formed in a stepped manner relative to the both end portions has been shown but the present invention is not limited to this shape. For example, the connection member 40 may be formed in a flat circular shape. In the embodiment, the assembled battery 30 composed of four unit cells 20 connected in series has been shown as the example, but the present invention is not limited regarding the number of unit cells 20 to be connected and the connection aspect. For example, by connecting five or more unit cells 20 in series, a high output of the assembled battery 30 can be achieved, and by adopting parallel connection or series-parallel connection, a high capacity can be attained. In the embodiment, the example that both the end portions of the connection member 40 are utilized as the connection portions to the unit cells has been shown, but the present invention is not limited to this example. For example, when three unit cells are connected in parallel, the connection member can be connected to the unit cells at its both end portions and central portion. Such connection can be realized by forming two step portions on the connection member 40 along the longitudinal direction thereof. A plurality of unit cells 30 can be additionally connected, and another connection member 40 may be used for the connection between the unit cells 30.

In the embodiment, the example that the flat lithium secondary cell is used as the unit cell 20 has been shown, but the present invention is not limited to the example. For example, the present invention can be applied to a cylindrical unit cell or a rectangular unit cell. The present invention is also applicable to an assembled battery obtained by connecting secondary unit cells such as nickel-hydrogen cells other than the lithium secondary cells.

In the embodiment, the example that lithium manganate is used as the positive electrode active material, the example that the amorphous carbon is used as the negative electrode active material, and the example that the non-aqueous electrolyte solution obtained by solving $LiPF_6$ in mixed solvent of EC and DMC is used have been shown, but the present invention is not limited to these cases. Material which is used in an ordinary lithium secondary cell can be used. As the positive electrode active material except for the lithium manganate, there are lithium transition metal double oxides such as lithium cobaltate or lithium nickel oxide, and as the negative electrode active material except for the amorphous carbon, there are carbon materials such as natural graphite or coke. As the non-aqueous electrolyte solution, solution obtained by solving ordinary lithium salt into organic solvent as electrolyte may be used. Lithium salt or organic solvent to be used in the present invention is not limited to specific one. As the electrolyte, for example, $LiClO_1$, $LiAsF_6$, $LiBF_1$, $LiB(C_6H_5)$, $CH_3SO_3Li$, $CF_3SO_3Li$ or the like can be used. As the organic solvent, propylene carbonate, diethyl carbonate, 1,2-dimethoxyethane, 1,2-diethoxyethane, γ-butyrolactone, tetrahydrofuran, 1,3-dioxolan, 4-methyl-1,3-dioxolan, diethyl ether, sulfolane, methyl sulfolane, acetonitrile, propionitrile, or the like, or mixed solution of two or more of these materials may be used. A mixing or blending ratio is not limited to a specific one.

EXAMPLES

Next, examples of the assembled battery 30 manufactured according to the embodiment will be explained. Incidentally, an assembled battery of a comparative example manufactured for comparison will be also described.

Example 1

In Example 1, an assembled battery 30 was manufactured by using a stacked metal plate obtained by stacking a metal plate 40a made from copper and having a length of 60 mm, a width of 20 mm, and a thickness of 0.3 mm and a metal plate 40b made from nickel and having a length of 60 mm, a width of 20 mm, and a thickness of 0.2 mm as the connection member 40.

Example 2

In Example 2, an assembled battery 30 was manufactured in the same manner as Example 1 except for using the metal plate 40a made from copper and having a length of 60 mm, a width of 20 mm, and a thickness of 0.4 mm and the metal plate 40b made from nickel and having a length of 60 mm, a width of 20 mm, and a thickness of 0.1 mm.

Example 3

In Example 3, an assembled battery 30 was manufactured in the same manner as Example 1 except for using the metal plate 40a made from aluminum and having a length of 60 mm, a width of 20 mm, and a thickness of 0.3 mm and the metal plate 40b made from nickel and having a length of 60 mm, a width of 20 mm, and a thickness of 0.2 mm.

Example 4

In Example 4, In Example 2, an assembled battery 30 was manufactured in the same manner as Example 1 except for using metal plate 40a made from aluminum and having a length of 60 mm, a width of 20 mm, and a thickness of 0.4 mm and the metal plate 40b made from nickel and having a length of 60 mm, a width of 20 mm, and a thickness of 0.1 mm.

Example 5

In Example 5, an assembled battery 30 was manufactured in the same manner as Example 1 except for using, as the connection plate, two metal plates made from nickel and having a length of 60 mm, a width of 20 mm, and a thickness of 0.1 mm and one metal plate made from copper and having a length of 60 mm, a width of 20 mm, and a thickness of 0.3 mm stacked such that the latter plate is positioned between the former plates.

Example 6

In Example 6, an assembled battery 30 was manufactured in the same manner as Example 1 except for using, as the connection plate, two metal plates made from nickel and having a length of 60 mm, a width of 20 mm, and a thickness of 0.1 mm and one metal plate made from aluminum and having a length of 60 mm, a width of 20 mm, and a thickness of 0.3 mm stacked such that the latter plate is positioned between the former plates.

Comparative Example 1

In Comparative Example 1, an assembled battery was manufactured in the same manner as Example 1 except for using one metal plate made from nickel and having a length of 60 mm, a width of 20 mm, and a thickness of 0.5 mm as a connection member.

<Test and Evaluation>

Regarding the assembled batteries of the respective Examples and the Comparative Example which were manufactured, masses and direct current resistances of the connection members 40 and the assembled batteries were measured, respectively. The direct current resistances were measured in the following manner. After the assembled batteries 30 were charged up to halves of the rating capacities thereof, an external circuit having an electron loading apparatus was connected to each of the positive electrode terminals (the positive electrode external terminal of the unit cell 20 in the assembled battery 30 which took the highest voltage) and each of the negative electrode terminals (the negative electrode external terminal of the unit cell 20 in the assembled battery 30 which took the lowest voltage), where constant current discharging was performed for 10 seconds with each current value of 10 A, 30 A, and 50 A. At this time, an assembled battery voltage at the tenth second at each current value was measured and a relationship between the voltage of the assembled battery 30 at the tenth and each discharge current was plotted on a graph so that a slope of an approximate straight line obtained from each tenth second voltage was calculated as a direct current resistance of the assembled battery 30.

The output density was calculated in the following manner. The output density was obtained by linearly extrapolating an approximate straight line obtained according to calculation of the direct current resistance up to 10.8V which was a discharge lower limit voltage (Vp), calculating a current value (Ip) at a crossing point of the approximate straight line and 10.8V, and diving the product of Vp and Ip by the mass of each assembled battery 30. The following Table 1 shows the result of the mass, the direct current resistance, and the output density.

TABLE 1

| | Mass of Connection Member (g) | DC R of Connection Member (mΩ) | Mass of Assembled Battery (kg) | DC R of Assembled Battery (mΩ) | Output Density of Assembled Battery (W/kg) |
|---|---|---|---|---|---|
| Example 1 | 5.3 | 0.13 | 3.22 | 5.4 | 2241 |
| Example 2 | 5.3 | 0.11 | 3.22 | 5.3 | 2271 |
| Example 3 | 3.1 | 0.20 | 3.21 | 5.6 | 2168 |
| Example 4 | 2.4 | 0.17 | 3.21 | 5.5 | 2200 |
| Example 5 | 5.3 | 0.13 | 3.22 | 5.4 | 2238 |
| Example 6 | 3.1 | 0.20 | 3.21 | 5.6 | 2169 |
| Comparative Example 1 | 5.3 | 0.37 | 3.22 | 6.1 | 1977 |

As shown in Table 1, in the assembled battery of Comparative Example 1 using one metal plate made from nickel as the connection member, the direct current resistance of the connection member showed 0.37 mΩ which was higher than that of each Example and the direct current resistance of the assembled battery showed 6.1 mΩ which was higher than that of each Example, so that the output density of the assembled battery showed 1977V/kg which was a numerical value lower than that of each Example.

On the other hand, in the assembled batteries 30 of Examples 1, 2, and 3 using the stacked metal layer composed of the metal plate made from copper and the metal plate made from nickel as the connection member 40, since densities of copper and nickel were approximately the same, the masses of the connection members 40 were the same as the mass of the connection member of Comparative Example 1, so that the masses of the assembled batteries 30 showed the same numerical value as that of Comparative Example 1. However, since the direct current resistances of the connection members 40 were very low such as about ⅓ of the connection member of Comparative Example 1, the direct current resistances of the assembled batteries 30 became low. As a result, it was confirmed that the output densities of the assembled batteries 30 showed 2238 to 2271 W/hr which were higher than that of the assembled battery of Comparative Example 1 by 10 percents or more. In the assembled batteries 30 of Examples 3, 4, and 5 using the stacked metal layer composed of the metal plate made from aluminum and the metal plate made from nickel as the connection member 40, the masses of the connection members 40 were light such as about ⅗ of the connection member of Comparative Example, so that the masses of the assembled batteries 30 was light, the direct current resistances of the connection members 40 were low such as about ½ of that to Comparative Example 1, and the direct current resistances of the assembled batteries 30 were low. As a result, it was confirmed that the output densities of the assembled batteries 30 shows 2168 to 2200 W/kg which were higher than the assembled battery of Comparative Example 1 by about 10 percents.

(Industrial Applicability)

Since the present invention provides an assembled battery which can improve output density, it contributes to manufacturing and marketing of the assembled battery, so that it has industrial applicability.

What is claimed is:

1. An assembled battery obtained by electrically connecting a plurality of unit batteries via a connection member, wherein each unit battery includes a steel battery container being sealed by a steel lid-cap having positive and negative electrode terminals, and wherein the connection member is a stacked metal plate obtained by stacking two metal plates of a nickel plate and an aluminum plate, wherein the aluminum plate, the nickel plate and the battery container or the lid cap are stacked in the aforementioned order at portions of the connection member connected to the positive and negative electrode terminals of the unit batteries and wherein a binary alloy of nickel and aluminum is present between the metal plates at the connected portions of the connection member.

2. An assembled battery according to claim 1, wherein the connection member is constituted such that a ratio of volume resistances (Ωm) of the nickel plate and the aluminum plate is 1/2 or less.

3. An assembled battery according to claim 1, wherein the battery container and the lid cap are plated with the same metal as metal of the nickel plate.

4. An assembled battery according to claim 1, wherein the binary alloy at the connected portions of the connection member is obtained by joining, by resistance welding, the battery container or the battery lid-cap and the connection member.

5. An assembled battery according to claim 1, wherein the connection member has the connected portions at each of both ends thereof, and a central portion thereof is stepped relative to the both end portions.

6. An assembled battery according to claim 5, wherein the central portion is positioned above both ends of the connection member via the stepped portions.

7. An assembled battery according to claim 5, wherein a hole for welding to the unit cells is formed at the both ends.

8. An assembled battery according to claim 7, wherein the hole for welding is formed in a cross shape.

9. An assembled battery according to claim 1, wherein a thickness of the aluminum plate is 3/5 or more of that of the connection member.

10. An assembled battery obtained by electrically connecting a plurality of unit batteries via a connection member, wherein each unit battery includes a steel battery container being sealed by a steel lid-cap having positive and negative electrode terminals, and wherein the connection member is a stacked metal plate obtained by stacking two metal plates, one of which is a nickel plate and the other of which is a metal plate having a volume resistance (Ωm) that is less than 50% of said nickel plate, wherein the volume of the nickel plate is between about 25% and 66% of the volume of the other metal plate, wherein the metal plate, the nickel plate and the battery container or the lid cap are stacked in this order at portions of the connection member connected to the positive and negative electrode terminals of the unit batteries and wherein a binary alloy is present between the nickel plate and the metal plate adjacent to each other at the connected portions of the connection member.

* * * * *